United States Patent [19]
Emsens

[11] Patent Number: 6,045,071
[45] Date of Patent: Apr. 4, 2000

[54] MACHINE FOR CUTTING OUT CALIBRATED PIECES OF FOOD PRODUCTS

[76] Inventor: Michel Emsens, Z.A. Du Parc, 42490 Fraisses, France

[21] Appl. No.: 09/214,165
[22] PCT Filed: Oct. 3, 1997
[86] PCT No.: PCT/FR97/01746
§ 371 Date: Dec. 29, 1998
§ 102(e) Date: Dec. 29, 1998
[87] PCT Pub. No.: WO98/15394
PCT Pub. Date: Apr. 16, 1998

[30] Foreign Application Priority Data
Oct. 7, 1996 [FR] France ................... 96 12470

[51] Int. Cl.⁷ .................................................. B02C 18/22
[52] U.S. Cl. .................... 241/101.4; 241/277; 241/285.1
[58] Field of Search ............................... 241/89.4, 95, 94, 241/285.1, 101.4, 277

[56] References Cited

U.S. PATENT DOCUMENTS 2,236,176  3/1941  Jagenburg .
4,436,012  3/1984  Hochanadel .
4,544,103  10/1985  Breeden .
5,038,649  8/1991  Hoaglin .

FOREIGN PATENT DOCUMENTS 0366441  10/1989  European Pat. Off. .
0713753  10/1995  European Pat. Off. .
2651167  1/1991   France .
3243448  5/1984   Germany .
4444506  9/1996   Germany .
838179   6/1960   United Kingdom .

Primary Examiner—Mark Rosenbaum
Attorney, Agent, or Firm—Wall Marjama Bilinski & Burr

[57] ABSTRACT

A machine for cutting a food product into dice-like sections that includes a two piece enclosure containing a chamber passing axially through said enclosure that is shaped to complement the cross-section of the food product. The two pieces of the enclosure can be opened to permit the product to be loaded into the chamber. A pusher rod is arranged to move through the chamber to drive the product through perpendicularly positioned cutting grids which cut the product into strips. A slicer is positioned adjacent the cutting grid for cutting the strips into dice like sections.

10 Claims, 5 Drawing Sheets

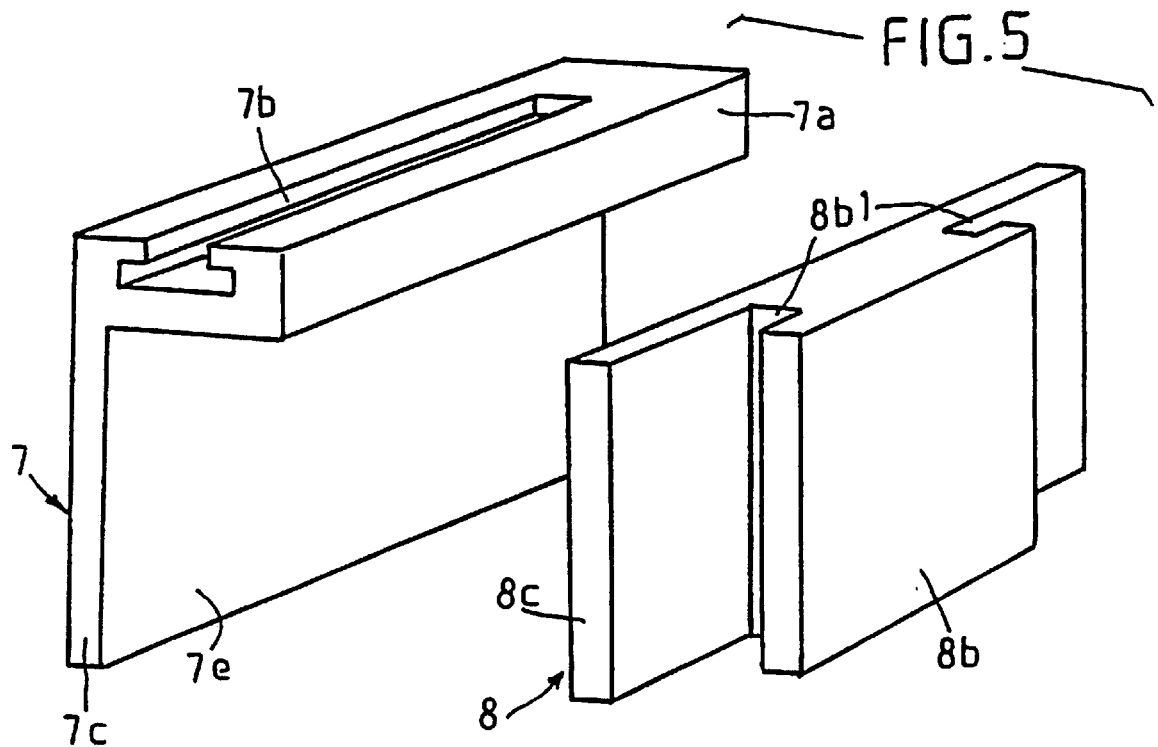
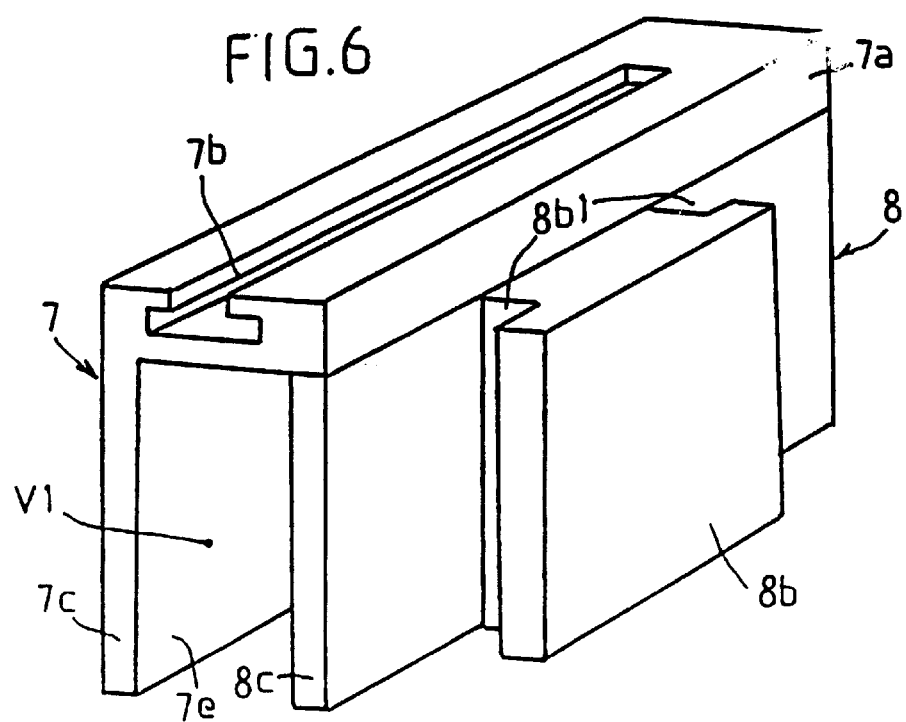

MACHINE FOR CUTTING OUT CALIBRATED PIECES OF FOOD PRODUCTS

BACKGROUND OF THE INVENTION

The invention relates to the technical field of farm-produce machines for the continuous production of calibrated pieces, for example in diced form.

Machines designed, in particular, for processing pieces of meat are known, these being equipped with means for cutting them along a plurality of vertical and horizontal planes in order to obtain pieces of reduced thickness. In general, these machines use a cutting system employing a first grid composed of plurality of vertical blades and a second juxtaposed grid composed of a plurality of horizontal blades. A rotary blade arranged laterally makes a cut in an orthogonal plane in relation to these grids in order to form calibrated pieces. This state of the art may be illustrated, as a non-limiting indication, by the teaching of the patent FR 2,651,167, of which the applicant of the present document is likewise the proprietor.

Essentially, the machine described in this patent comprises a chamber or enclosure delimiting a closed volume intended for receiving the product to be sliced. One of the ends of the enclosure cooperates with a pusher member in order to ensure that the product is displaced linearly in the direction of the cutting system which is shaped so as to produce the calibrated dice or pieces of meat. The food product to be processed may have various shapes at the outset.

For example, this product may consist of a slice of meat of greater or lesser thickness. In this case, the enclosure delimits a volume corresponding very substantially to that of the slice, a presser member making it possible to adjust the volume of the enclosure as a function of the thickness of the slice.

Or else the product may consist of a block of meat or the like delimiting a large volume which is usually of parallelepipedic shape. Consequently, the enclosure of the machine delimits a volume of general parallelepipedic shape, making it possible to carry out the centering and guidance of the product to be cut under the conditions mentioned above. It is, indeed, very important that the product in the form of a block can be constantly guided and centered during its displacement in the direction of the cutting and preslicing systems in order to obtain calibrated pieces having a suitable appearance, which, at the same time, are prevented from being shredded in the region of the cutting blades. In view of the parallelepipedic shape of the block of meat or the like to be processed, this centering and guidance in the enclosure do not present any particular problem.

By contrast, this enclosure can receive only a very specific type of product which, in any event, must have a parallelepipedic or generally parallelepipedic overall volume. It is therefore not possible for a food product in the form of a block delimiting a different volume, in particular cylindrical, to be processed under good conditions. Increasingly, then, food products are either in the form of a parallelepipedic block or in the form of a cylindrical block.

In the light of this, it seemed important to have the possibility of processing any type of block of meat or the like on the same machine, for the purpose of obtaining perfectly calibrated cut pieces under very good conditions. In particular, it was necessary to solve the problem presented by the constant guidance and centering of the product when the latter is not parallelepipedic, but has a general cylindrical shape.

The problem which the invention proposes to solve, therefore, is to have the possibility of processing, on the same machine, a food product which delimits a general volume of any shape, the aim being to obtain perfectly calibrated cut pieces, whatever this shape may be.

SUMMARY OF THE INVENTION

In order to solve this problem, a machine was designed and developed of the type which, in a known way, comprises:
  a chamber or enclosure, in which the product to be processed is arranged;
  at least one jack equipped with a pusher member for leading the product in the direction of a system of cutting grids which are capable of making a plurality of cuts along two orthogonal planes;
  a slicing blade arranged in front of the system of grids in order to cause the product to be cut into calibrated pieces during its displacement through the said grids.

According to the invention, proceeding from this type of machine and bearing in mind the set problem to be solved, the chamber has means for the removable mounting of shaping elements of defined shape and dimensions in order to delimit an internal volume corresponding to the external volume of the product to be cut, for the purpose of centering it perfectly in the said internal volume thus produced, the cutting grids being mounted in a support delimiting a shape corresponding to that of the internal volume produced, the said shape being arranged coaxially to the said volume.

In order to solve the set problem of having the possibility of modifying the volume of the chamber, as desired, as a function of the volume of the product to be processed, the means for mounting the shaping elements consist of at least one profiled slide which part of the chamber possesses, the said slide cooperating with a complementary slot which part of the shaping elements possesses.

Advantageously, the shaping elements either delimit a circular cross section or delimit a quadrangular (square, rectangular, etc.) cross section.

In order to solve the set problem of the interchangeability of the shaping elements, on the one hand, and of the loading of the processing chamber, on the other hand, the shaping elements are in two interlockable parts, one being fixed, while the other is movable, at the same time having arrangements for coupling to part of a member for filling and closing the chamber.

The fixed part has a squared-off rim, in the thickness of which is formed the coupling slot which is open-ended in order to cooperate by sliding with the slide of the chamber, the said fixed part having a length corresponding substantially to that of the chamber.

The movable part is arranged laterally in relation to the fixed part.

In order to solve the set problem of ensuring the constant centering and guidance of the product when it is subjected to the action of the cutting grids, the supports of the said grids are removably mounted in coaxial alignment with the open-ended orifice of the chamber receiving the shaping elements, in such a way that the shape formed by the grids is arranged in continuity with the shape of the internal volume delimited by the said shaping elements.

Advantageously, still with the aim of having constant guidance and centering of the product during its displacement in the chamber as a function of the volume of the said product, the pusher member has a shape corresponding to that of the internal volume delimited by the shaping elements, the said member having arrangements for coupling to the rod of the jack.

BRIEF DESCRIPTION OF THE DRAWINGS

The invention is described in more detail below by means of the accompanying drawings in which:

FIG. 5 is a view, similar to that of FIG. 3, with regard to a product of general parallelepipedic volume;

FIG. 6 is a view, corresponding to that of FIG. 5, after the interlocking of the component parts of the shaping element;

Figure 1:
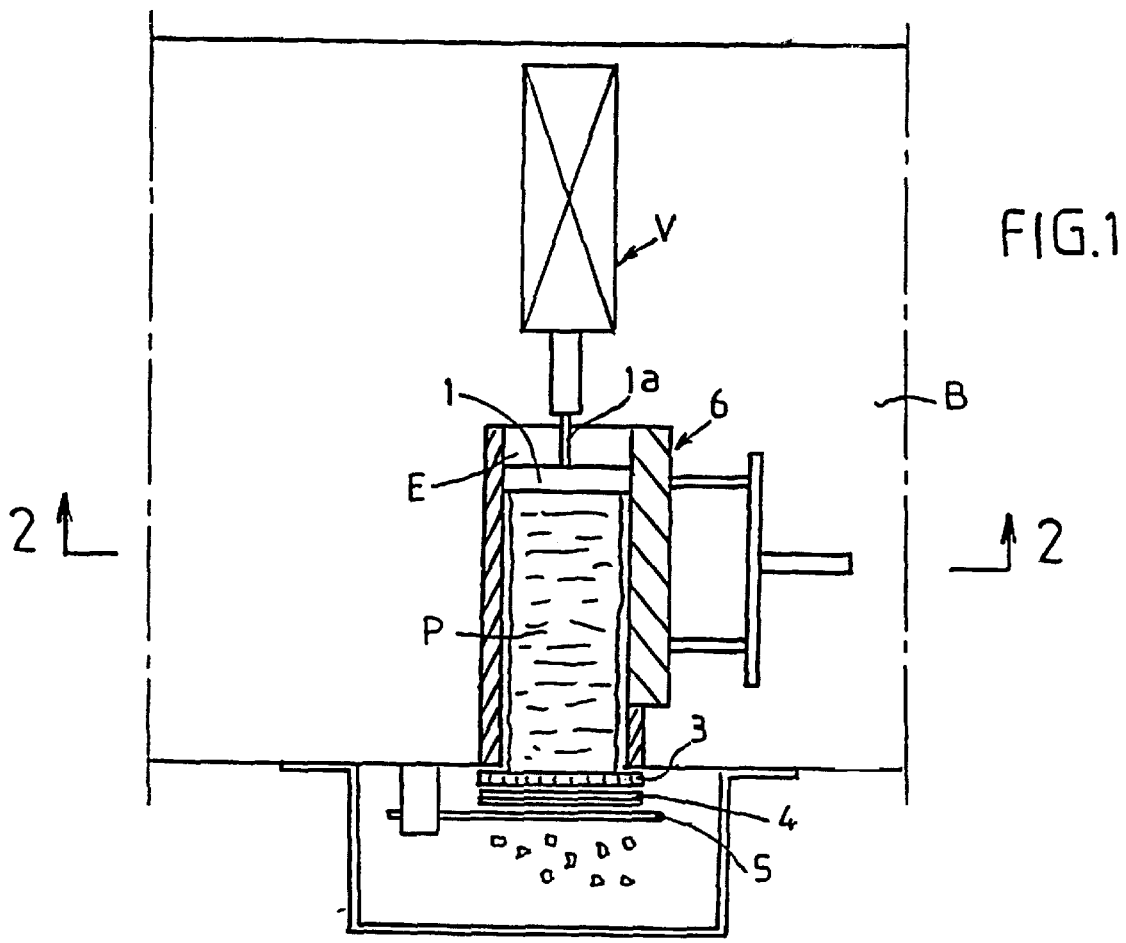
FIG. 1 is a diagrammatic plane view of an exemplary embodiment of the machine.
Figure 2:
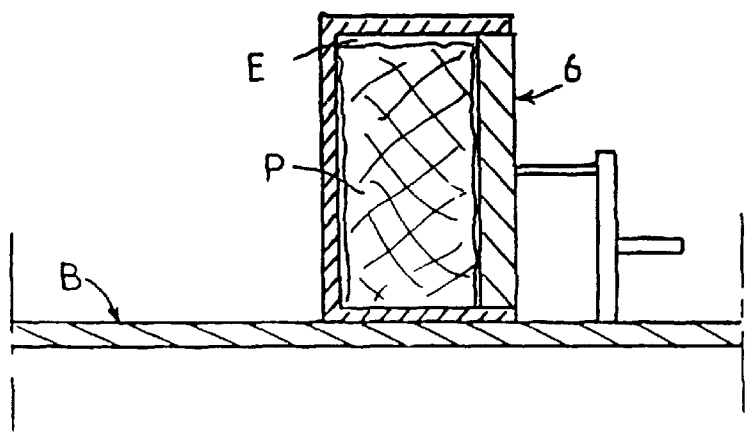
FIG. 2 is a view in longitudinal section along the line 2—2 of FIG. 1.

In order better to understand the rest of the description, it may be said that the machine has a supporting frame (B) equipped with a chamber or enclosure (E) intended for receiving the food product to be processed (P). The enclosure (E) delimits a closed volume of general parallelepipedic shape. A pusher member (1) is mounted, with a capability of sliding, inside the enclosure (E), at the same time being fastened, for example, to a double-acting jack (V). The jack (V) is arranged at the rear of the chamber and coaxially to the latter. Opposite the jack (V), the enclosure (E) is open-ended in order to be in communication with a system of cutting grids (3) and (4) and of a rotary cutting blade (5). The grids (3) and (4) are juxtaposed, the grid (3) having, for example, a plurality of vertical blades (3a), whilst the grid (4) has a plurality of horizontal blades (4a). A motor member, not illustrated, cooperates with the support (3b, 4b) of each of the grids in order to subject the corresponding blades to an alternating displacement movement in translational motion.

The displacement of the product (P) through the grids (3) and (4) under the effect of the thrust of the jack (V) gives rise, in combination with the action of the rotary blade (5), to the cutting of the product (P) into a plurality of calibrated pieces. The product (P) is positioned in the enclosure (E) by means of a loading member (6) arranged laterally in relation to the enclosure (E). The loading member (6) is coupled to any mechanical, pneumatic or such like means in order to be displaced linearly in the direction of the enclosure (E).

According to a characteristic on which the invention is based, the chamber or enclosure (E) has means for the removable mounting of shaping elements which are designated as a whole by (C) and the shapes and dimensions of which are defined so as to delimit an internal volume (V1) corresponding to the external volume (V2) of the product (P) to be cut. Advantageously, each shaping element (C) is made in two profiled interlockable parts (7) and (8) in order, in combination, to delimit the desired volume (V1).

The part (7) is fixed and has arrangements for temporary coupling to the chamber (E). For example, the part (7) has a squared-off rim (7a), in the thickness of which is formed an open-ended slot (7b) having a cross section in the form of an upturned T. This slot (7b) cooperates by sliding with a rib of complementary shape (9) which the chamber (E), in particular the upper face of the latter, possesses. The squared-off rim (7a) is extended by a lateral edge (7c) cooperating by a bearing contact with the corresponding lateral edge of the chamber (E).

The part (8) is movable and is shaped so as to be interlocked in combination with the fixed part (7). In particular, the part (8) cooperates with the squared-off rim (7a) and the lateral edge (7c). Moreover, this part (8) has, over its entire length, a recess (8a) which is intended, in combination with a complementary recess (7d) of the fixed part (7), to form the internal volume (V1) corresponding to the product to be processed.

Figure 3:
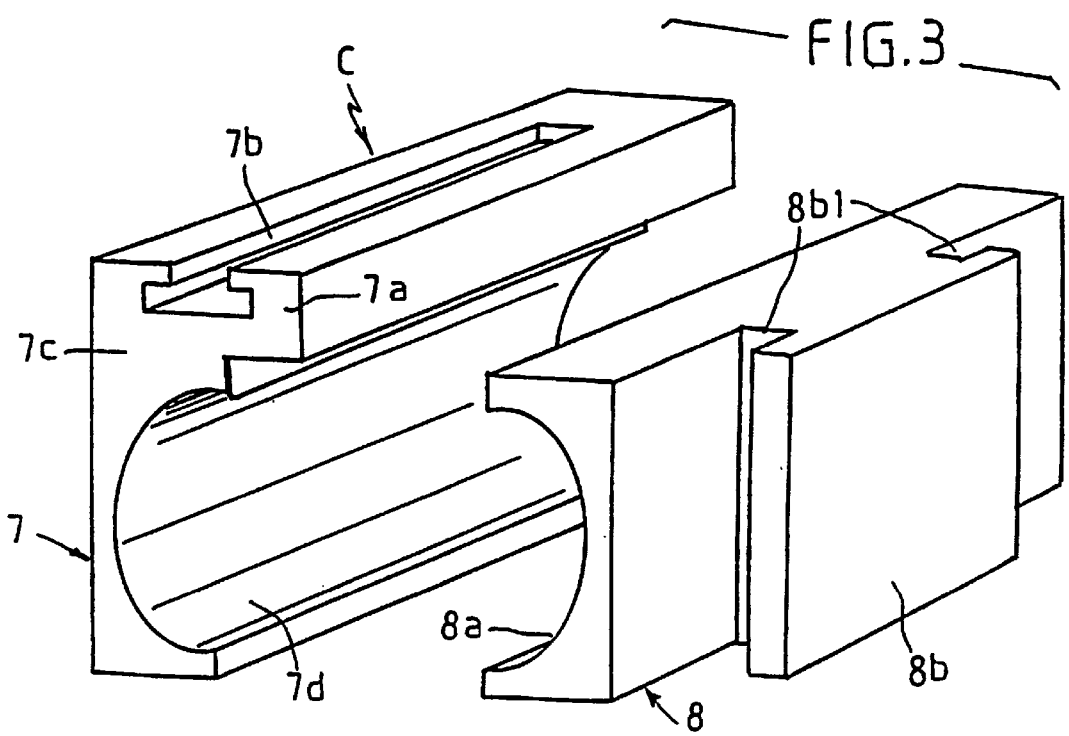
FIG. 3 is a perspective view prior to the interlocking of the component parts of the shaping element with regard to a product of general cylindrical volume.
Figure 4:
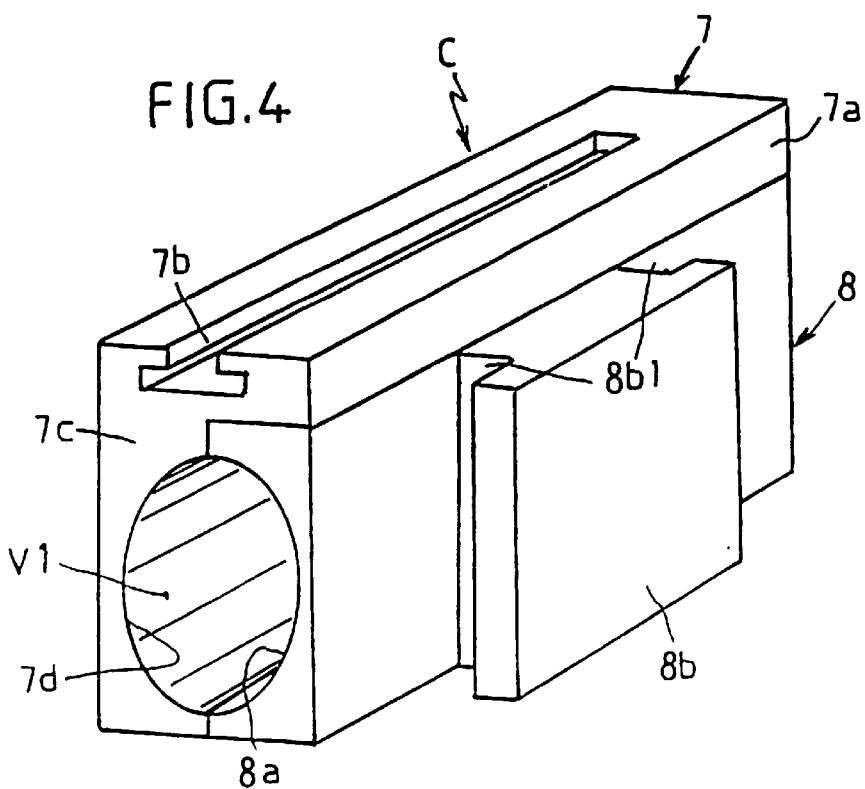
FIG. 4 is a view, corresponding to that of FIG. 3, after the interlocking of the component parts of the shaping element.

In the example of FIGS. 3 and 4, after the parts (7) and (8) have been interlocked, the recesses (7d) and (8a) delimit an internal volume of general circular shape. The movable part (8) has coupling arrangements (8b) capable of cooperating with complementary arrangements which the loader (6) possesses. For example, the external lateral edge of the part (8) has a centering shape delimiting two vertical end slots (8b1), so as to be engaged on corresponding parts (6a) of the loader (6).

When the shaping element is to delimit an internal volume (V1) of quadrangular cross section, it is sufficient to adapt the parts (7) and (8) accordingly. In this case, as shown in FIGS. 5 and 6, the lateral edge (7c) has a straight plane internal face (7e), whilst the part (8) simply has a straight vertical bearing face (8c). The dimensions of the recesses (7d) and (8a), or else the thickness of the parts (7e) and (8c), are, of course, defined as a function of the dimensions of the desired volume (V1).

After the parts (7) and (8), whatever form they take, have been interlocked, the shaping element thus formed has external dimensions (length, width and depth) which correspond to those of the chamber (E).

Figure 7:
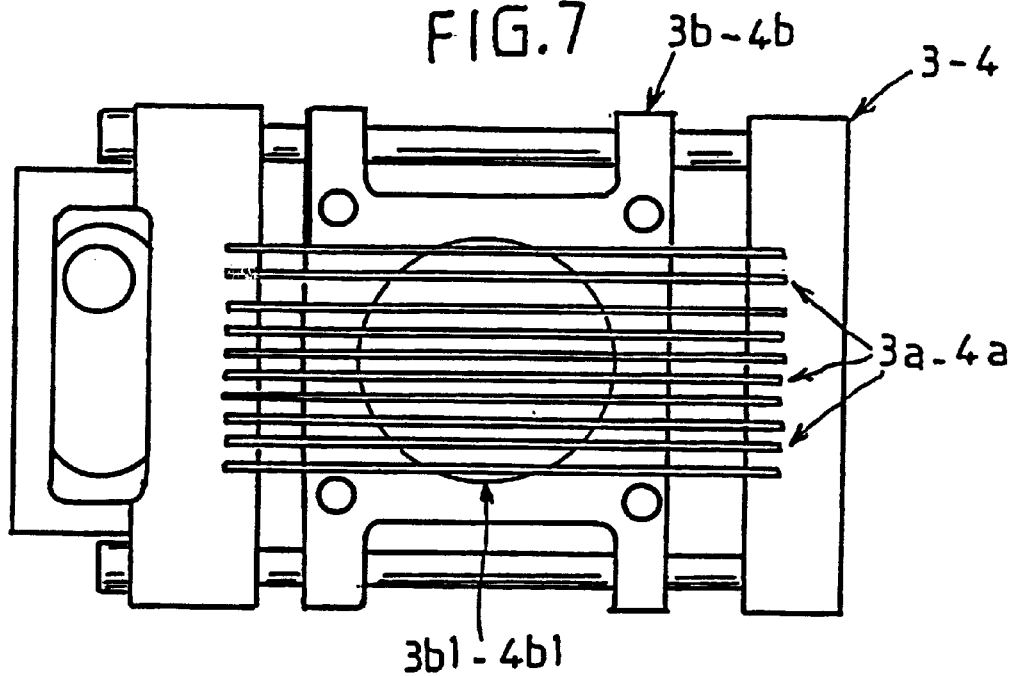
FIG. 7 is a front view of a support of cutting grids with regard to a circular shape.
Figure 8:
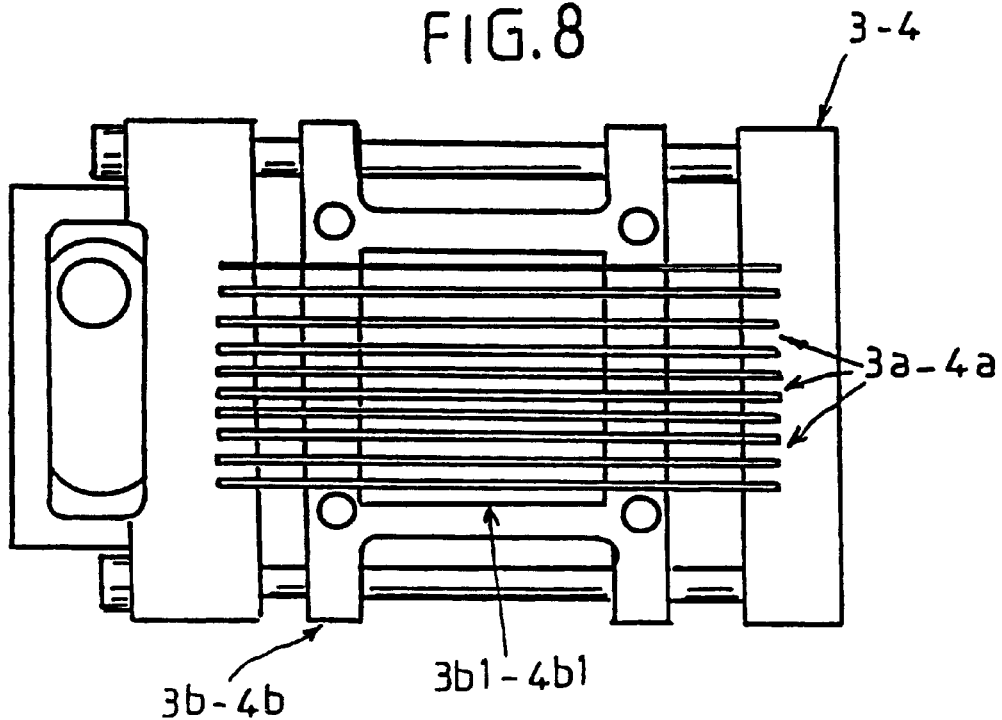
FIG. 8 is a view, similar to that of FIG. 7, with regard to a quadrangular shape.
Figure 9:
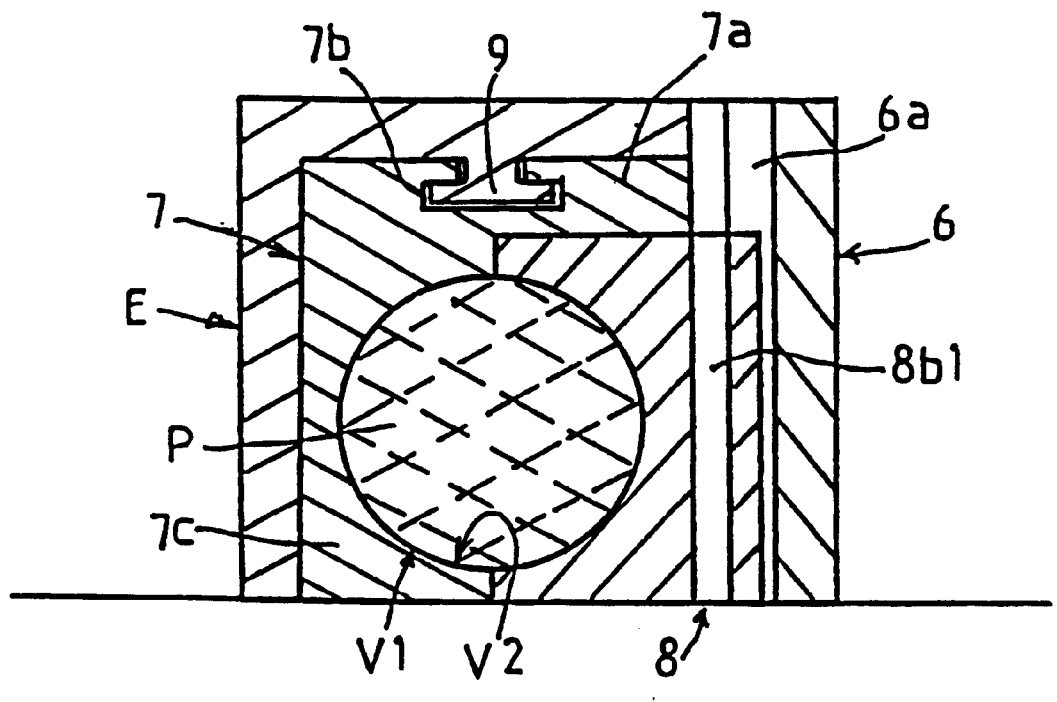
FIG. 9 is a view in cross section in line with the shaping element receiving a product of general cylindrical shape.
Figure 10:
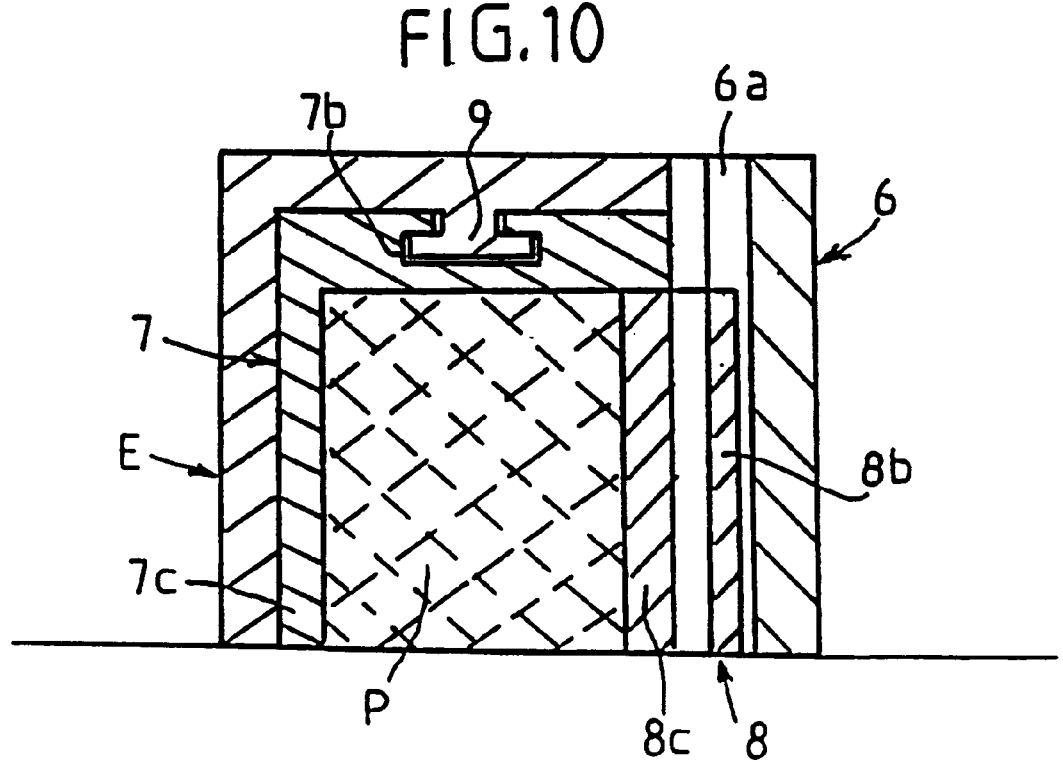
FIG. 10 is a view, similar to that of FIG. 9, with regard to a product of general quadrangular shape.

According to another characteristic of the invention, the supports (3b) and (4b) of the cutting grids have a facial orifice, through which the said grids emerge, the said orifice having a shape corresponding to the cross section of the internal volume in question (V1), that is to say to the external volume of the product to be processed. With regard to a volume (V1) of circular cross section, each of the supports (3b) and (4b) delimits a central orifice (3b1, 4b1), through which the vertical (3a) or horizontal (4a) blades pass and which has a general circular shape (FIG. 7). As regards a volume (V1) of quadrangular (square, rectangular, etc.) cross section, each of the supports (3b) and (4b) delimits a central orifice (3b1) and (4b1) of corresponding shape (square, rectangular, etc.) (see FIG. 8).

The supports (3b) and (4b) are removably mounted independently in coaxial alignment with the open-ended orifice of the chamber (E) receiving the parts (7) and (8) of the corresponding shaping element. For example, these supports (3b) and (4b) are mounted on centering and guiding studs formed on either side of the open-ended orifice of the chamber. The result of this is that, after the supports (3b) and (4b) have been mounted next to one another on the centering studs, their corresponding orifices (3b1) and (4b1), through which the blades emerge, are arranged strictly in coaxial alignment and in continuity with the shape of the internal volume (V1).

In view of these arrangements, there is therefore no interruption in the region of the internal volume (V1) and of the cutting grids, so that the product is constantly guided and centered, including in the region of action of the various cutting blades.

Still with the aim of ensuring constant centering of the product inside the volume (V1) produced by the interlocking of the parts (7) and (8) of the shaping element in question, the pusher member (1) has a shape corresponding to that of the said volume (V1). This pusher member therefore has a general circular or quadrangular shape. Under these conditions, this pusher member (1) is coupled removably in relation to the jack (V), for example by means of a rod (1a) shaped so as to be force-fitted into a corresponding bore formed at the end of the rod of the jack (V).

In view of these design arrangements, therefore, it becomes clear that it is possible to process any type of product, whatever the general shape of its external volume, by means of a single machine which, at the outset, has a chamber or enclosure (E) of general quadrangular shape. It is sufficient, for this purpose, to equip the chamber (E) with a corresponding shaping element. The part (7a) of the shaping element in question is coupled in the region of the rib (9) of the enclosure, whilst the loader (6) is equipped with the other corresponding part (8) of the shaping element. A new chamber is thus obtained, the internal volume (V1) of which corresponds very accurately to the external volume of the product (P) to be processed. The systems of cutting grids (3) and (4) are adapted accordingly.

The shaping elements, in particular the parts (7) and (8), are made from molded plastic of the food-compatible type. The various means for controlling the members of the machine with regard, particularly, to the pusher jack, the loader and the cutting, are not described in detail, since they do not form part of the specific subject of the invention and may have various embodiments known perfectly well to an average person skilled in the art.

The advantages become clear from the description. In particular, the following are emphasized and recalled:

the ease with which the volume of the chamber intended for receiving the food product to be processed is changed in order to adapt it very accurately to the external volume of the product in question;

the constant guidance and centering of the product, particularly in the region of the cutting system, during its continuous displacement;

the simplicity of execution.

I claim:
1. A machine for cutting a food product into desired parts that includes
   an enclosure means having two shaping elements that coact to define an internal chamber corresponding to the shape of a product to be cut, said chamber passing through said enclosure axially between a front opening and a rear opening;
   a mounting means for supporting the enclosure means;
   a jack means equipped with a pusher that is arranged to pass into said front opening of the chamber and move toward said rear opening to drive a product in said chamber through said rear opening;
   a system of cutting grids mounted adjacent to said rear opening for making a plurality of orthogonal cuts in said product passing through said rear opening; and
   slicing means positioned adjacent to said cutting grids for cutting said product passing through said cutting grids into parts.
2. The apparatus of claim 1 wherein said mounting means further includes a slide means for slidably supporting at least one of said coacting shaping elements.
3. The apparatus of claim 2 wherein one of said shaping elements has a slot that is slidably received in said mounting means.
4. The apparatus of claim 1 wherein said chamber has a circular cross-section.
5. The apparatus of claim 1 wherein said chamber has a polygonal cross-section.
6. The apparatus of claim 1 wherein said shaping elements include two interlocking elements that are separatably mounted in said mounting means to move between an open and a closed position wherein a food product can be placed in said chamber when the shaping elements are in said open position.
7. The apparatus of claim 6 wherein one of said shaping elements is slidably attached to said mounting means and the other shaping element is arranged to open laterally with regard to said one shaping element.
8. The apparatus of claim 1 wherein said cutting grids are removably mounted adjacent to the rear opening of the chamber.
9. The apparatus of claim 1 wherein said shaping elements are made of food compatible plastic.
10. The apparatus of claim 1 wherein the pusher has a shape that complements the cross sectional shape of said chamber.

* * * * *